United States Patent
Takeda et al.

(10) Patent No.: US 9,871,421 B2
(45) Date of Patent: Jan. 16, 2018

(54) SPLIT-CORE TYPE MOTOR AND METHOD OF MANUFACTURING ARMATURE OF SPLIT-CORE TYPE MOTOR

(71) Applicant: SANYO DENKI CO., LTD., Tokyo (JP)

(72) Inventors: Tooru Takeda, Tokyo (JP); Shintarou Koichi, Tokyo (JP); Kenta Matsuhashi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 596 days.

(21) Appl. No.: 14/077,403

(22) Filed: Nov. 12, 2013

(65) Prior Publication Data

US 2014/0132096 A1  May 15, 2014

(30) Foreign Application Priority Data

Nov. 15, 2012  (JP) ................................. 2012-251487

(51) Int. Cl.
*H02K 3/50*  (2006.01)
*H02K 15/12* (2006.01)
(Continued)

(52) U.S. Cl.
CPC ................. *H02K 3/50* (2013.01); *H02K 3/52* (2013.01); *H02K 15/0068* (2013.01);
(Continued)

(58) Field of Classification Search
CPC ........... H02K 3/50; H02K 3/52; H02K 3/522; H02K 3/525; H02K 15/026;
(Continued)

(56) References Cited

U.S. PATENT DOCUMENTS 5,289,068 A * 2/1994 Veronesi .................. B63G 8/08
310/114
9,062,678 B2 * 6/2015 Tsuboi ..................... F04C 18/16
(Continued)

FOREIGN PATENT DOCUMENTS

CN       102782995 A    11/2012
EP         1404006 A1    3/2004
(Continued)

OTHER PUBLICATIONS

Japanese Office Action dated Feb. 2, 2016 for the corresponding Japanese Patent Application No. 2012-251487.
(Continued)

*Primary Examiner* — Bernard Rojas
*Assistant Examiner* — Alexander Singh
(74) *Attorney, Agent, or Firm* — Polsinelli PC

(57) ABSTRACT

A split-core type motor makes work for connecting lead wires of split coils simple and efficient and reduces manufacturing costs and time taken to connect wires is realized. The split-core type motor includes a plurality of split coils formed by winding coils on split cores on which insulating members have been mounted; a stator formed by disposing the plurality of split coils in an annular shape; crimp terminals that connect lead wires of the split coils by being crimped so that the lead wires of the split coils correspond to a u phase, a v phase, and a w phase of a three-phase AC power source, and form terminals corresponding to the u phase, the v phase, and the w phase, respectively; and a resin mold part that covers the coils and the lead wires while power line connecting portions of the crimp terminals are exposed to the outside.

7 Claims, 14 Drawing Sheets

(51) Int. Cl.
*H02K 3/52* (2006.01)
*H02K 15/02* (2006.01)
*H02K 15/00* (2006.01)
*H02K 15/095* (2006.01)

(52) U.S. Cl.
CPC .......... *H02K 15/026* (2013.01); *H02K 15/12* (2013.01); *H02K 15/0075* (2013.01); *H02K 15/095* (2013.01); *Y10T 29/49009* (2015.01)

(58) Field of Classification Search
CPC .......... H02K 15/0068; H02K 15/0043; H02K 15/0062; H02K 5/08; H02K 5/10; H02K 1/148; H02K 15/12; H02K 15/095; H02K 15/0075; Y10T 29/49009
USPC .... 310/71, 214, 215, 216.114, 43, 400, 406, 310/407, 260, 270, 194, 216.008, 216.009
See application file for complete search history.

(56) References Cited

U.S. PATENT DOCUMENTS

| | | |
|---|---|---|
| 2002/0043883 A1 | 4/2002 | Shimizu |
| 2004/0061386 A1 | 4/2004 | Amagi |
| 2005/0212378 A1* | 9/2005 | Wang .................... H02K 1/148 310/260 |
| 2005/0285456 A1 | 12/2005 | Amagi |
| 2009/0096313 A1 | 4/2009 | Harada et al. |
| 2011/0020154 A1 | 1/2011 | Matsuda et al. |
| 2012/0091840 A1 | 4/2012 | Nakanishi |
| 2012/0286593 A1 | 11/2012 | Yokogawa |
| 2012/0293024 A1 | 11/2012 | Yokogawa |

FOREIGN PATENT DOCUMENTS

| | | | |
|---|---|---|---|
| EP | 2448095 A1 | 5/2012 | |
| JP | 11-252844 | 9/1999 | |
| JP | 2002125348 A | 4/2002 | |
| JP | 2004120923 A | 4/2004 | |
| JP | 2008178256 A | 7/2008 | |
| JP | 2009261150 A | 11/2009 | |
| JP | 2009291004 A | 12/2009 | |
| WO | WO 2011108736 A1 | 9/2011 | |
| WO | WO 2012017727 A1 * | 2/2012 | .............. F04C 18/16 |

OTHER PUBLICATIONS

European Search Report dated Jul. 13, 2016 from European Patent Application No. 13191772.6, pp. 1-8.
Office Action dated Feb. 4, 2017 issued in corresponding Chinese Patent Application No. 201310547935.7.

* cited by examiner

SPLIT-CORE TYPE MOTOR AND METHOD OF MANUFACTURING ARMATURE OF SPLIT-CORE TYPE MOTOR

CROSS-REFERENCE TO RELATED APPLICATION

This application claims priority to Japanese Application No. 2012-251487, filed Nov. 15, 2012, the entirety of which is incorporated herein by reference.

BACKGROUND

1. Technical Field

The present invention relates to a split-core type motor in which a plurality of split cores on which coils have been wound are assembled in an annular shape to form a stator (armature), and a method of manufacturing an armature of the split-core type motor.

2. Description of Related Arts

In general, a split-core type motor includes an excitation unit that includes a plurality of permanent magnets provided along a rotor core in a circumferential direction, and an armature which is provided so as to surround the excitation unit and in which a plurality of split coils are built in along a stator core in the circumferential direction.

The split-core type motor makes current flow in the coils of the armature so as to cross the magnetic flux generated by the permanent magnets of the excitation unit, and rotates a rotor by generating a driving force on the rotor in the circumferential direction by electromagnetic induction.

A split coil, which is formed by winding first and second coils on the outside and inside of teeth respectively in a radial direction and connecting both the coils in the form of one coil through crimping, soldering, adhesion, a printed circuit board, or the like, is disclosed as a technique relating to an armature of a split-core type motor (for example, see Japanese Patent Application Laid-Open Publication No. (JP-A) 11-252844). In addition, the respective coils wound on the respective teeth form a three-phase armature coil by being connected, and an annular yoke part is disposed on the outer periphery of the three-phase armature coil.

Incidentally, in the technique of JP-A 11-252844, the first and second coils form one coil by being connected through crimping, soldering, adhesion, a printed circuit board, or the like. However, in JP-A 11-252844, a technique for forming one coil with the first and second coils focuses on increasing the cross-sectional area of the coil in a slot by forming the cross-sectional shape of the coil that corresponds to a slot shape.

Further, in the technique of JP-A 11-252844, the respective coils wound on the respective teeth form the three-phase armature coil by being connected. However, the specific wire-connection structure of the three-phase armature coil is not mentioned at all.

Furthermore, methods of connecting the coils, such as crimping, soldering, adhesion, and a printed circuit board, are mentioned on the same level in the technique of JP-A 11-252844. That is, manufacturing costs including which method is more advantageous in the reduction of time taken to connect wires is not considered in the technique of JP-A 11-252844.

In particular, when a split coil having a large number of lead wires is connected by soldering that has been most widely used in the past, much time is taken to connect wires, so that manufacturing costs are increased.

SUMMARY

The invention has been made in consideration of the above-mentioned circumstances, is intended to make work for connecting lead wires of coils wound on split cores simple and efficient, and provide a method of manufacturing a split-core type motor capable of reducing manufacturing costs, and an armature of the split-core type motor, by reducing the time taken to connect wires.

To achieve the above object, a split-core type motor according to an aspect of the invention includes an excitation unit that includes permanent magnets and an armature that includes a plurality of split coils. The armature includes at least the plurality of split coils, a stator, crimp terminals, and a resin mold part.

The plurality of split coils are formed by winding coils on split cores on which insulating members have been mounted, The stator is formed by disposing the plurality of split coils in an annular shape and molding the annular split coils with the resin mold part.

The crimp terminals include power line connecting portions. The crimp terminals connect lead wires of the split coils by being crimped so that the lead wires of the split coils correspond to a u phase, a v phase, and a w phase of a three-phase AC power source, and form terminals corresponding to the u phase, the v phase, and the w phase, respectively.

The resin mold part covers the coils and the lead wires while the power line connecting portions of the crimp terminals are exposed to the outside.

Meanwhile, a method of manufacturing an armature of a split-core type motor according to another aspect of the invention is a method of manufacturing an armature of a split-core type motor in which a plurality of split coils are built in a stator core, and includes at least producing the split coils, assembling the split coils, connecting the split coils, and molding a stator.

In the producing of the split coils, the plurality of split coils are produced by mounting insulating members on split stator cores and winding coils on the split cores.

In the assembling of the split coils, the plurality of split coils are assembled in an annular shape.

In the connecting of the split coils, lead wires of the split coils are connected by crimping crimp terminals including power line connecting portions so that the lead wires of the split coils correspond to a u phase, a v phase, and a w phase of a three-phase AC power source, and the crimp terminals form terminals that correspond to the u phase, the v phase, and the w phase, respectively.

In the molding of the stator, the coils and the lead wires are covered with a resin mold part so that power line connecting portions of the crimp terminals are exposed to the outside.

According to the aspect of the invention, the crimp terminals including the power line connecting portions connect the lead wires of the coils wound on the plurality of split cores by being crimped so that the lead wires of the split coils correspond to the u phase, the v phase, and the w phase of the three-phase AC power source. The crimp terminals form terminals that correspond to the u phase, the v phase, and the w phase, respectively.

Further, according to the aspect of the invention, since the stator is formed by covering and filling the coils and the lead wires with the resin mold part while the power line connecting portions of the crimp terminals are exposed to the outside, the power line connecting portions are easily installed on the resin mold part.

Accordingly, the split-core type motor according to the aspect of the invention makes the work for connecting the lead wires of the coils wound on the split cores simple and efficient and can reduce manufacturing costs by reducing the time taken to connect wires.

DETAILED DESCRIPTION

A split-core type motor according to an embodiment and a method of manufacturing an armature of the split-core type motor will be described below with reference to the drawings.

In the split-core type motor according to this embodiment, lead wires of coils, which are wound on a plurality of split cores, are connected so as to correspond to a u phase, a v phase, and a w phase of a three-phase AC power source by the crimping of crimp terminals that include power line connecting portions. The crimp terminals form terminals that correspond to the u phase, the v phase, and the w phase, respectively.

Further, in the split-core type motor according to this embodiment, the coils and the lead wires are covered and filled with a resin mold part while the power line connecting portions of the crimp terminals are exposed to the outside. As a result, a stator is formed. The power line connecting portions are easily installed on the resin mold part.

Therefore, according to this embodiment, a split-core type motor, which makes the work for connecting the lead wires of the coils wound on the split cores simple and efficient and can reduce manufacturing costs by reducing the time taken to connect wires, is realized.

[Structure of Split-Core Type Motor]

Figure 1:
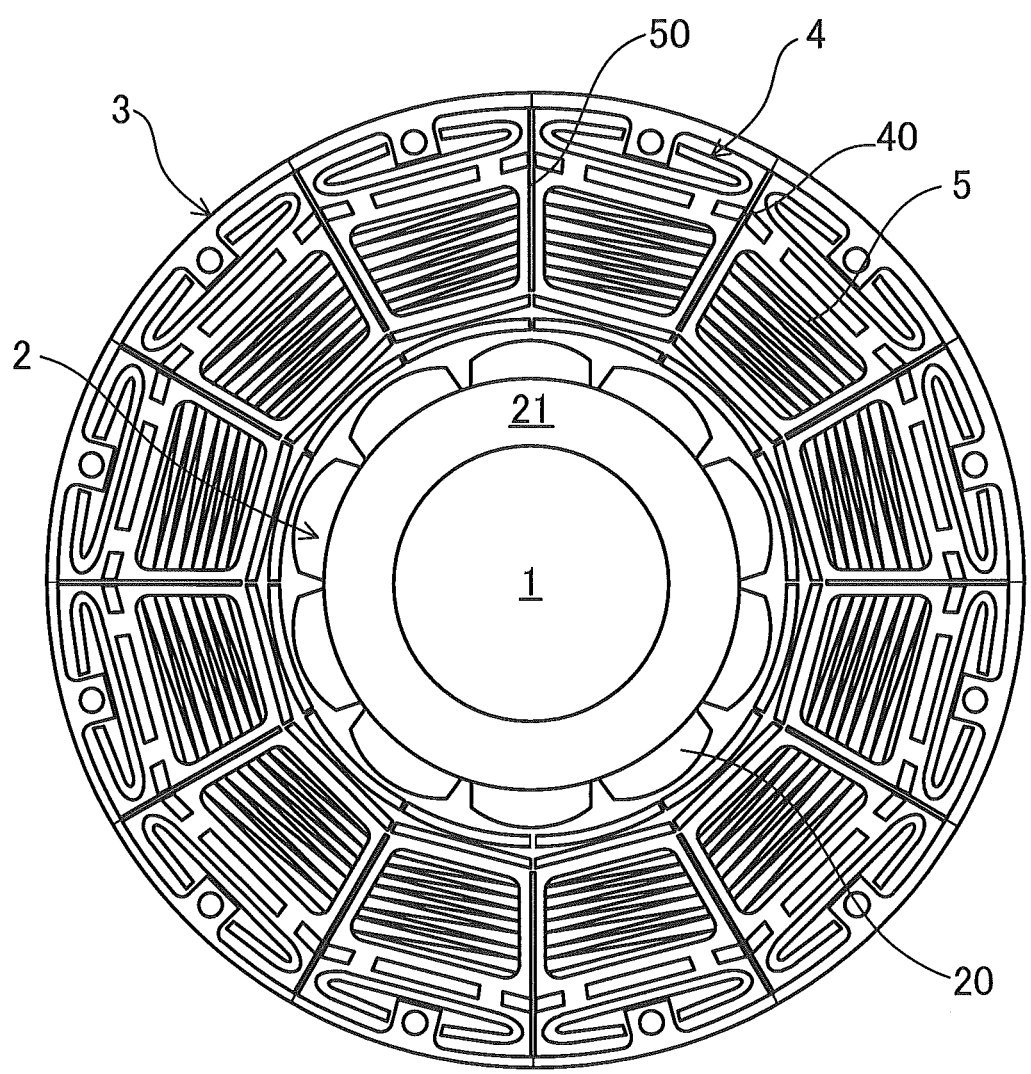
FIG. 1 is a schematic diagram when a split-core type motor according to an embodiment is formed as a SPM motor.
Figure 2:
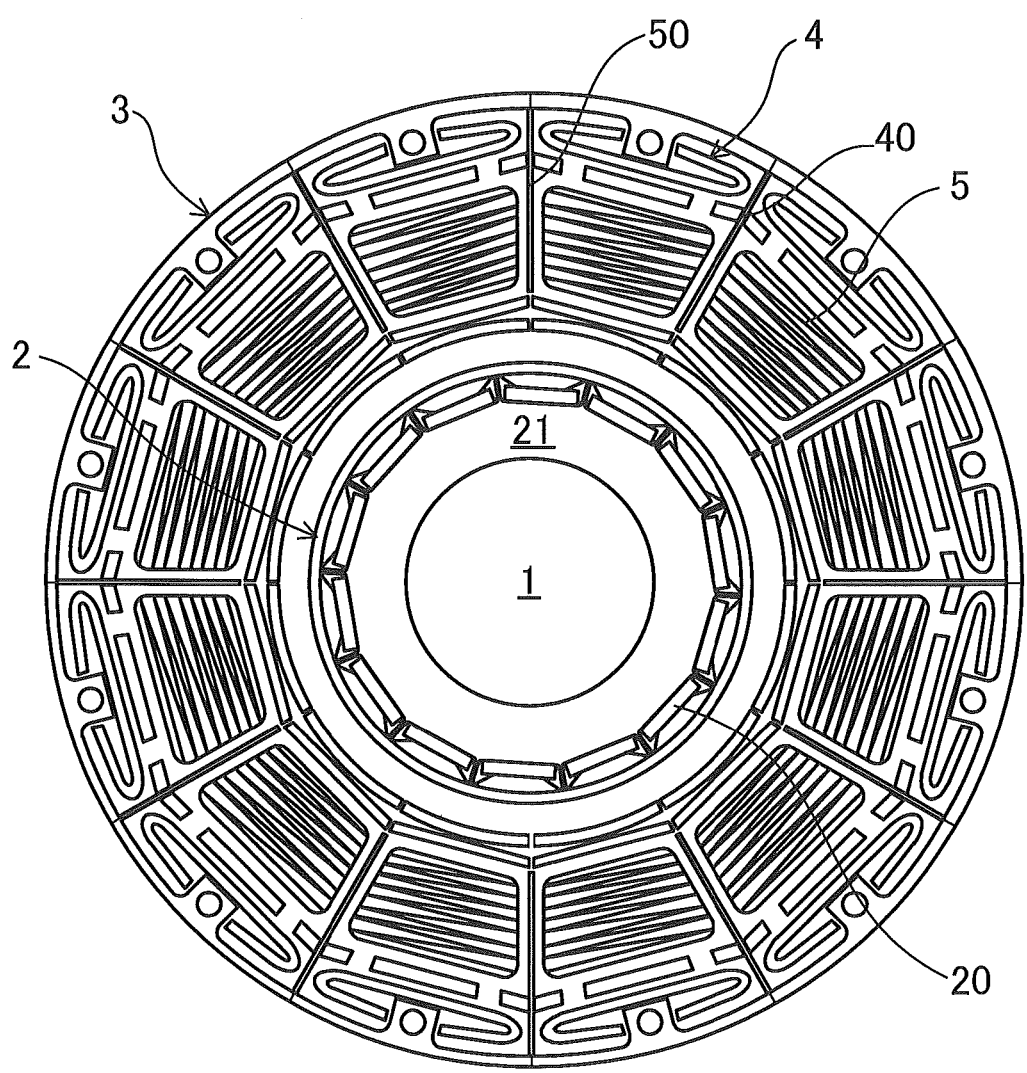
FIG. 2 is a schematic diagram when the split-core type motor according to this embodiment is formed as an IPM motor.
Figure 3:
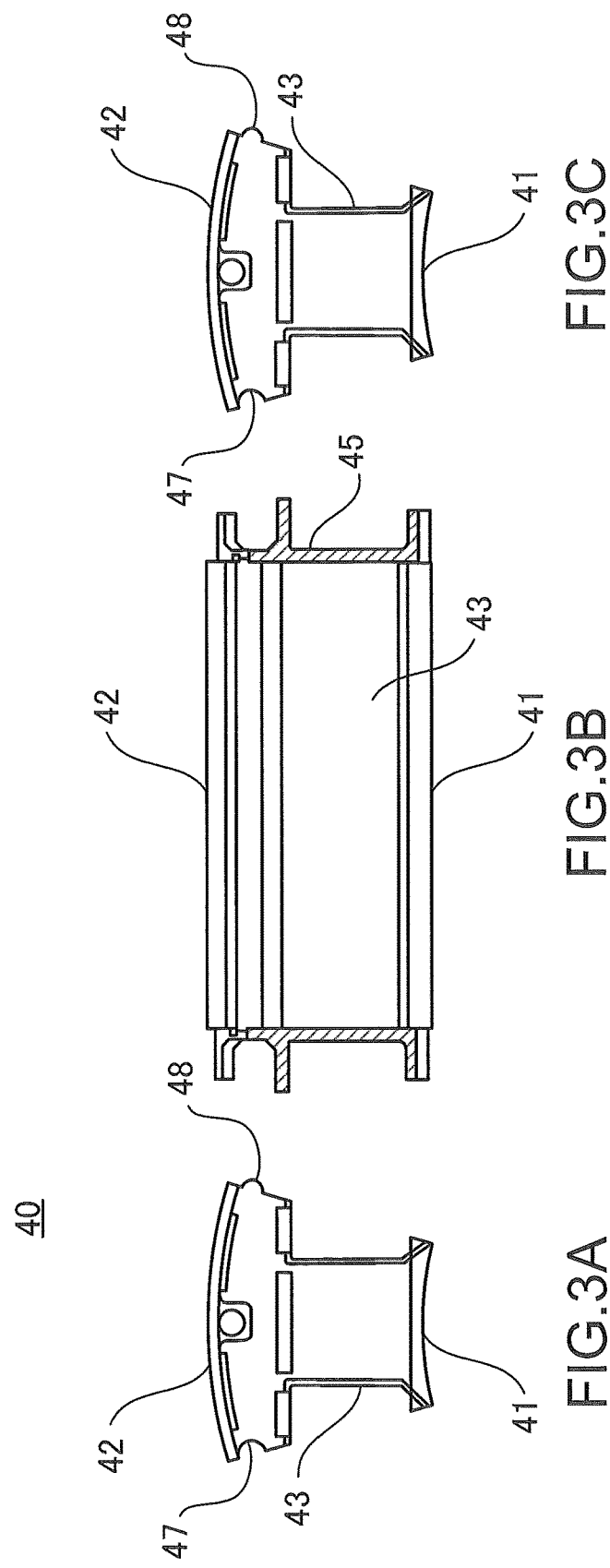
FIG. 3A illustrate a left side view of a split core of this embodiment.
FIG. 3B illustrate a front view of a split core of this embodiment.
FIG. 3C illustrate a right side view of a split core of this embodiment.

First, the structure of an armature of the split-core type motor according to this embodiment will be described with reference to FIGS. 1 to 13. FIG. 1 is a schematic diagram when the split-core type motor according to this embodiment is formed as a SPM motor. FIG. 2 is a schematic diagram when the split-core type motor according to this embodiment is formed as an IPM motor.

As illustrated in FIGS. 1 and 2, the split-core type motor 100 according to this embodiment includes an excitation unit 2 that includes a plurality of permanent magnets 20 provided around a rotating shaft 1 and an armature 3 that is provided around the excitation unit 2 and includes a plurality of split coils 50. In this embodiment, the armature 3 functions as a stator and the excitation unit 2 functions as a rotor.

The armature 3 includes a stator core 4 and coils 5.

A plurality of split cores 40 is combined in the shape of a torus to form the stator core 4 (see FIGS. 5 and 6 to be described below). The stator core 4 of this embodiment is formed of twelve split cores 40, but the number of the split cores 40 is not limited.

Since the split-core type motor 100 according to this embodiment uses a three-phase AC power source as a power source, the number of the split cores 40 is a multiple of 3. As the number of the split cores 40 is increased, it is easier to form the stator core 4 in the shape of a perfect circle. On the other hand, since the number of coils 5 wound on the split cores 40 is increased when the number of the split cores 40 is excessively large, the man-hours taken to connect wires of the coils 5 are increased.

Figure 4:
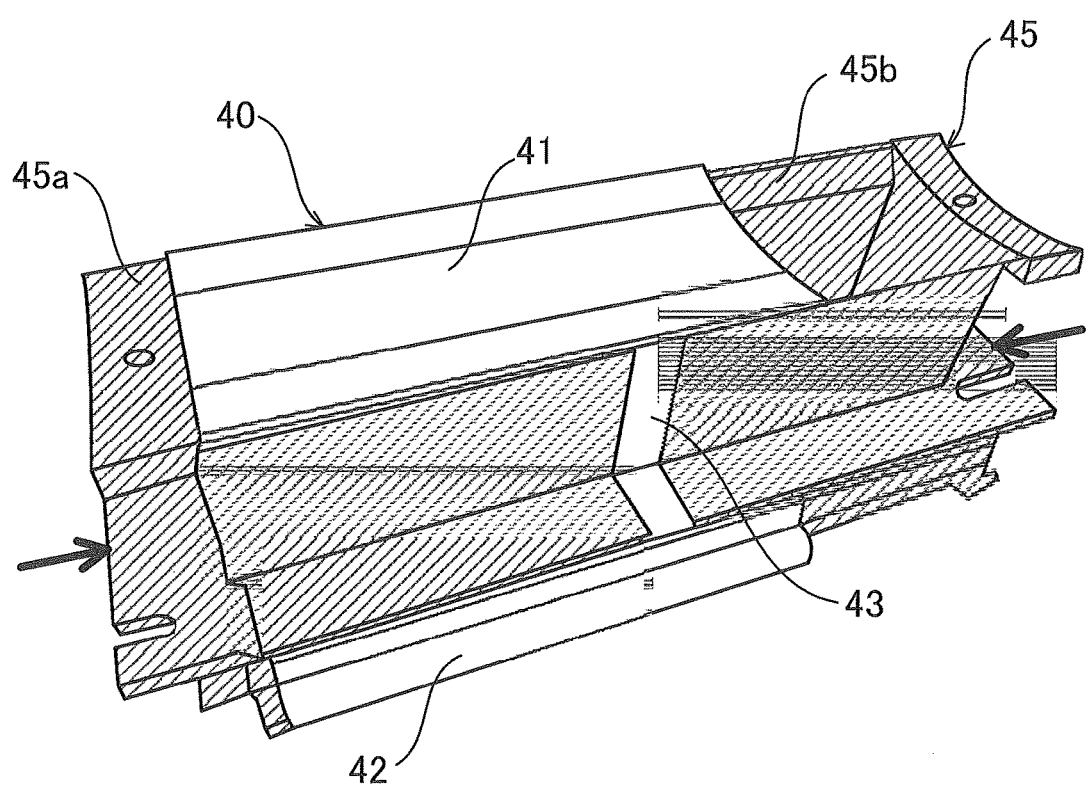
FIG. 4 is a schematic perspective view of the split core of this embodiment.

FIGS. 3A to 3C illustrate front views and a side view of a split core of this embodiment. FIG. 4 is a schematic perspective view of the split core of this embodiment.

As illustrated in FIGS. 3A to 3C, and 4, the split core 40 is formed in the shape of, for example, a short H-type rail. That is, the split core 40 has a shape in which a core body 43 is interposed between a stator core-inner diameter portion 41 and a stator core-outer diameter portion 42. The inner surface of the stator core-inner diameter portion 41 and the outer surface of the stator core-outer diameter portion 42 are formed by a press so as to have an arc-shaped cross-section.

The split core 40 is covered with an insulating member 45 that is illustrated as a shaded portion in FIGS. 3A to 3C, and 4. The material of the insulating member 45 is a resin molding that is obtained by molding, for example, a synthetic resin by a die. The shape of the insulating member 45 is formed so as to cover both ends of the core body 43, the stator core-inner diameter portion 41, and the stator core-outer diameter portion 42 of the split core 40 in a longitudinal direction.

As illustrated in FIGS. 3A to 3C, a recess 47 and a protrusion 48, which are used to assemble the split cores 40 in an annular shape by making the split cores 40 come into contact with each other, are formed on the combined surfaces of the stator core-outer diameter portion 42. Meanwhile, the recess 47 and the protrusion 48 are not illustrated in drawings except in FIGS. 3A to 3C for the convenience of illustration.

The insulating member 45 of this embodiment is formed of a pair of insulating insertion members 45a and 45b. The insulating insertion members 45a and 45b are mounted on the split core 40 by being inserted from both ends of the split core 40 in the longitudinal direction.

Referring to FIGS. 1 to 4, the coil 5 is wound around the core body 43 of the split core 40 on which the insulating member 45 has been mounted. For example, a coated wire such as an enameled wire is employed as the winding wire of the coil 5. An automatic winding machine (not illustrated) is used as a winding machine for the coil 5.

The split coil 50 of this embodiment means a block in which the coil 5 is wound on the split core 40 on which the insulating member 45 has been mounted. Twelve split coils 50 are formed in the stator (armature) 3 of this embodiment.

Figure 5:
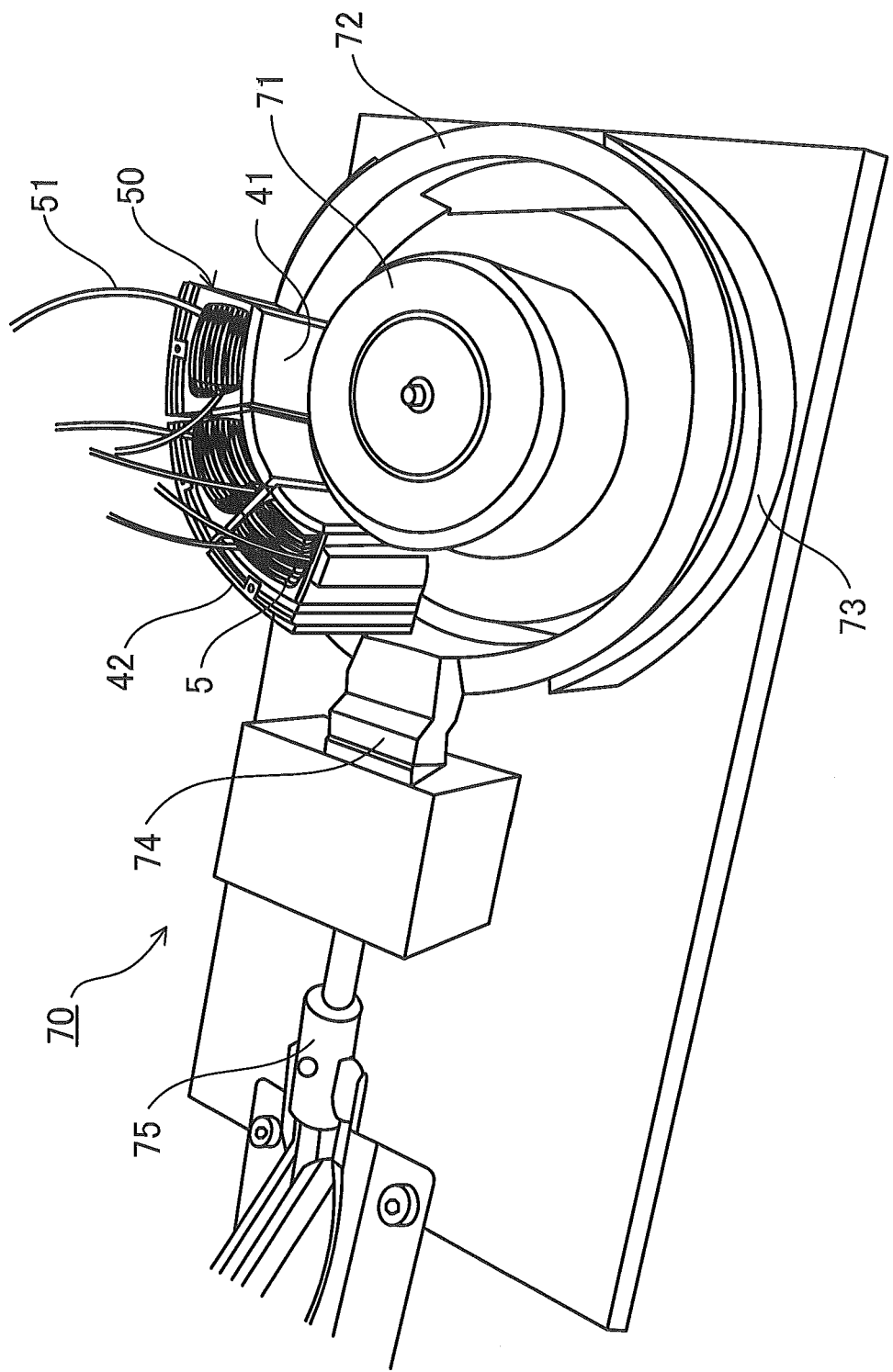
FIG. 5 is a schematic perspective view illustrating a state in which split coils of this embodiment are disposed.

FIG. 5 is a schematic perspective view illustrating a state in which the split coils of this embodiment are disposed. FIG. 6 is a schematic diagram illustrating a state in which the split coils of this embodiment are disposed in an annular shape. Meanwhile, for convenience of illustration, the lead wires 51 of the split coils 50 are not illustrated in FIG. 6 (see FIG. 5).

Figure 6:
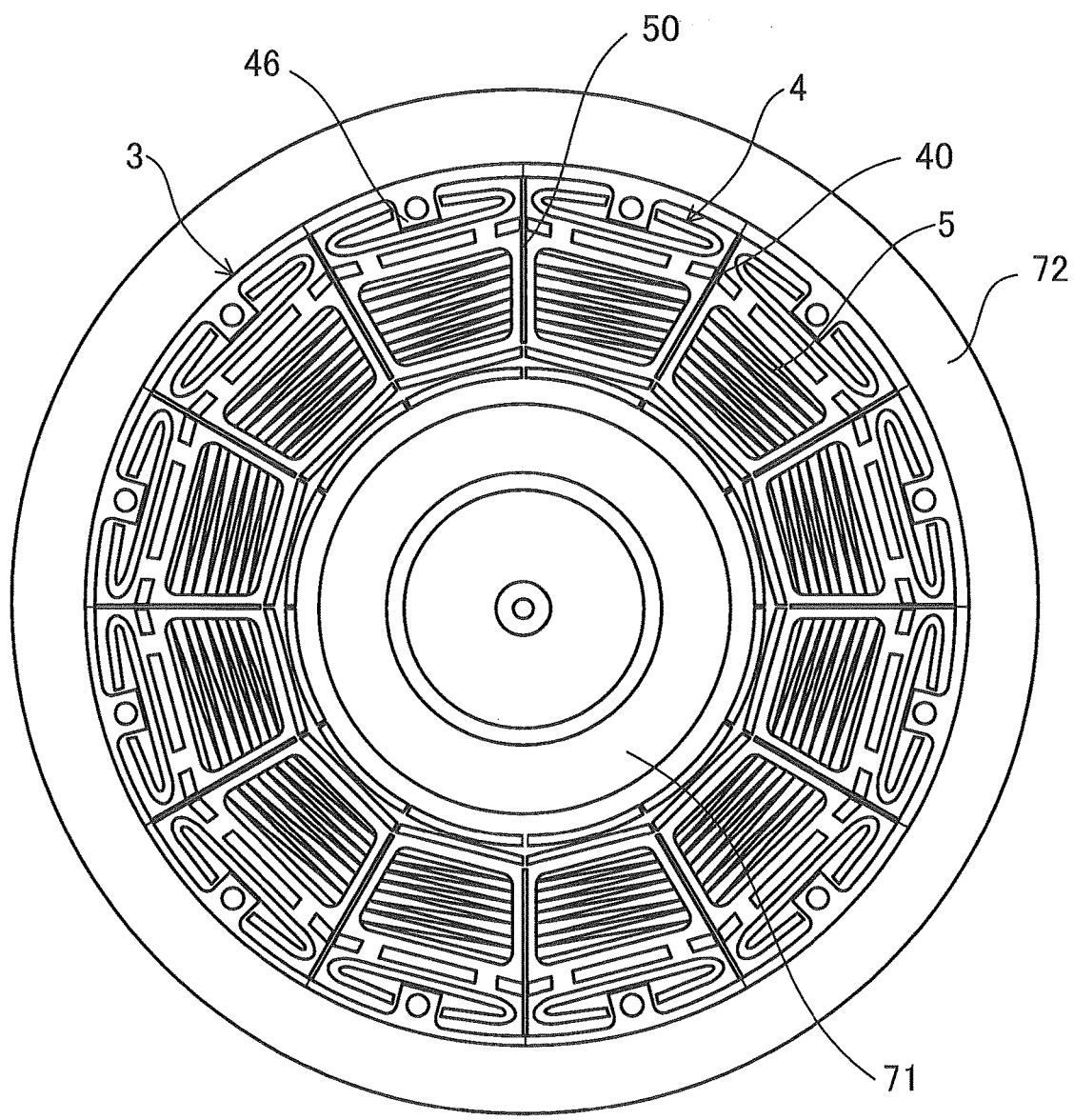
FIG. 6 is a schematic diagram illustrating a state in which the split coils of this embodiment are disposed in an annular shape.

As illustrated in FIGS. 5 and 6, the respective split coils 50 are disposed in an annular shape so that the stator core-inner diameter portions 41 form the inner diameter of the armature and the stator core-outer diameter portions 42 form the outer diameter of the armature. The split coils 50 are combined with each other by the engagement between the recesses 47 and the protrusions 48 that are formed on the combined surfaces of the stator core-outer diameter portions 42 of the split cores 40 (see FIGS. 3A to 3C). A rounding jig 70 is used to dispose the plurality of split coils 50 in the shape of a torus.

The rounding jig 70 includes a columnar solid jig 71, a fixing ring 72 that is disposed around the solid jig 71 with a predetermined interval interposed therebetween, a support jig 73 that supports the peripheral portion of the fixing ring 72, gripping means 74 for gripping the fixing ring 72, and a cylinder device 75 that advances and retracts the gripping means 74.

Twelve split coils 50 are combined in an annular shape to form the annular stator core 4 including the coils 5. Two lead wires 51, each of which is formed by covering an enameled wire with a synthetic resin tube having a function of connecting wires, are extracted from each of the split coils 50.

Referring to FIG. 6, a support portion 46 into which an insertion pin 64 of a terminal block 60 to be described below is inserted is provided in the middle of the stator core-outer diameter portion 42 of each of the split cores 40. The support portion 46 is formed of, for example, a tube that is formed integrally with the stator core-outer diameter portion 42 of the split core 40, has a rectangular appearance, and includes a circular hole.

For example, a soft magnetic body such as a silicon steel sheet is used as the material of the stator core 4, but the material of the stator core 4 is not limited to the exemplified material.

The stator core-outer diameter portion 42 of the stator core 4 has a function of suppressing the magnetic lines of force that easily leak to the outside and maximizing the electromagnetic induction effect of permanent magnets of a rotor (movable element).

Figure 7:
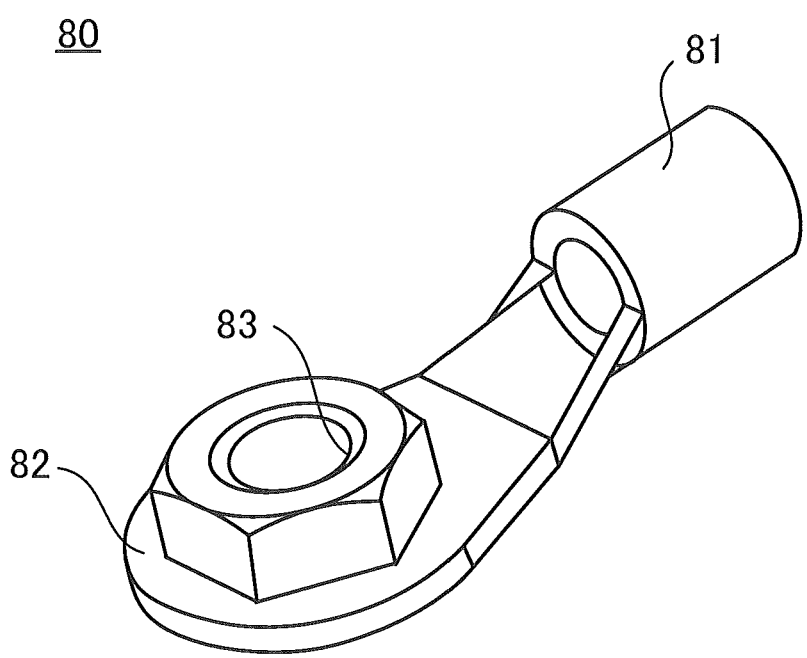
FIG. 7 is a schematic perspective view of a crimp terminal that is used in this embodiment.

FIG. 7 is a schematic perspective view of the crimp terminal that is used in this embodiment.

As illustrated in FIGS. 5 and 7, the lead wires 51 of the split coils 50 are connected using the crimp terminals 80. The crimp terminal 80 includes a crimp tube 81 that connects the lead wires 51 by being crimped, a disc portion 82 that is provided at the tip of the crimp tube 81, a nut-like power line connecting portion 83 which is provided on the surface of the disc portion 82 and in which a female screw is formed, and a temporarily fixed portion (not illustrated) that is provided on the surface of the disc portion 82 and is fitted to a terminal block 60 (see FIG. 9) to be described below.

The lead wires 51 of the split coils 50 are inserted into the crimp tube 81 and the crimp tube 81 is crimped inward in a radial direction, so that the crimp terminal 80 connects the lead wires 51. The material of the crimp terminal 80 is selected in view of conductivity and a crimping property, and for example, a terminal made of a material formed by tinning oxygen-free copper (JIS C1011) is employed.

Figure 8A:
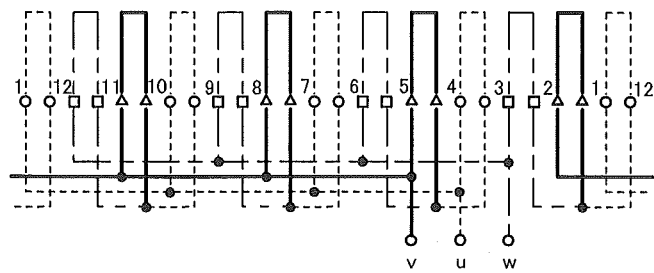
FIG. 8A is a diagram illustrating a three-phase AC connection circuit of lead wires of coils of this embodiment.
Figure 8B:
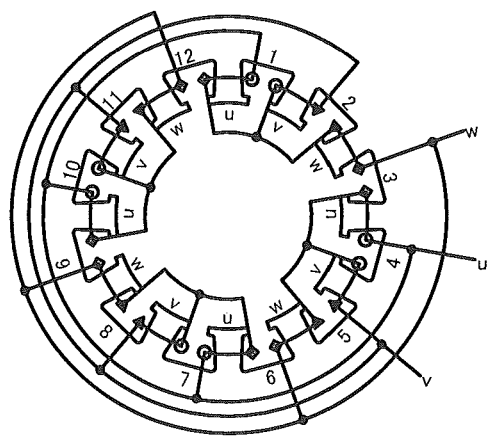
FIG. 8B is a diagram illustrating a three-phase AC connection circuit of lead wires of coils of this embodiment.

FIGS. 8A and 8B are diagrams illustrating a three-phase AC connection circuit of the lead wires 51 of the split coils 50 of this embodiment.

As illustrated in FIGS. 5 to 8A, and 8B, three crimp terminals 80 are used so as to correspond to the u phase, the v phase, and the w phase of the three-phase AC power source. That is, the one-side lead wires 51 of the four split coils 50 are connected to one crimp terminal 80 by the crimping of the crimp terminal.

Figure 9:
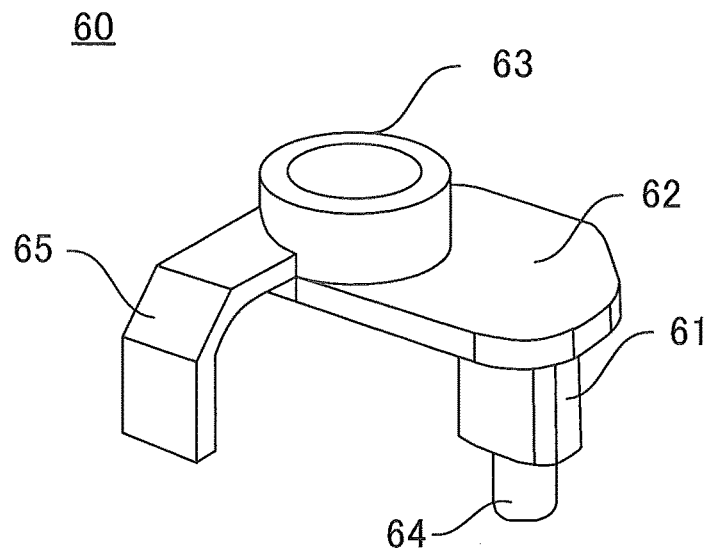
FIG. 9 is a schematic perspective view of a terminal block of this embodiment.
Figure 10:
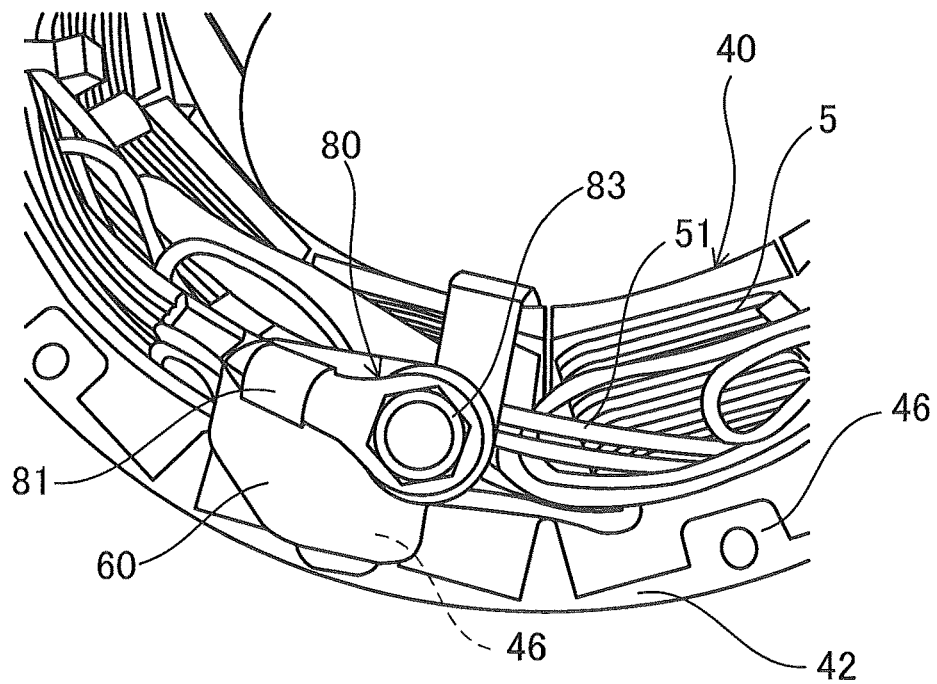
FIG. 10 is a schematic diagram illustrating a state in which the crimp terminal of this embodiment is temporarily fixed onto the terminal block.

FIG. 9 is a schematic perspective view of a terminal block of this embodiment. FIG. 10 is a schematic diagram illustrating a state in which the crimp terminal of this embodiment is temporarily fixed onto the terminal block.

As illustrated in FIGS. 9 and 10, three crimp terminals 80 are fixed to the terminal blocks 60. The terminal block 60 is a resin molding in which a pillar portion 61, a base portion 62, a terminal fixing portion 63, an insertion pin 64, and a leg portion 65 are integrally molded by a die. In this embodiment, the same material as the material of the insulating member 45 is used as the material of the terminal block 60.

A body of the terminal block 60 is formed of the pillar portion 61. The base portion 62 having, for example, a substantially trapezoidal shape is provided at the upper end of the pillar portion 61. The terminal fixing portion 63 having a cylindrical shape is provided on the base portion 62. The insertion pin 64, which is to be inserted into the circular hole of the support portion 46 of the split core 40, is provided at the lower end of the pillar portion 61 (see FIG. 6).

The insertion pin 64 of the terminal block 60 is inserted into the support portion 46 of the split core 40, so that the terminal block 60 is fixed to the support portion 46. The terminal blocks 60 are fixed to arbitrary three support portions among the support portions 46 of the split cores 40 so as to correspond to the u phase, the v phase, and the w phase of the three-phase AC power source.

The leg portion 65 is bent from the base portion 62 in an L shape, and prevents the collapse of the terminal block 60 by being seated on a resin mold part 30 to be described below. Further, the lead wires 51 of the split coils 50 are received in a space below the leg portion 65.

The crimp terminal 80 is fixed to the cylindrical terminal fixing portion 63 of the terminal block 60. The crimp tube 81 of the crimp terminal 80 is placed on the base portion 62 of the terminal block 60. The power line connecting portion 83 is disposed at an upper portion of the crimp terminal 80.

Figure 11:
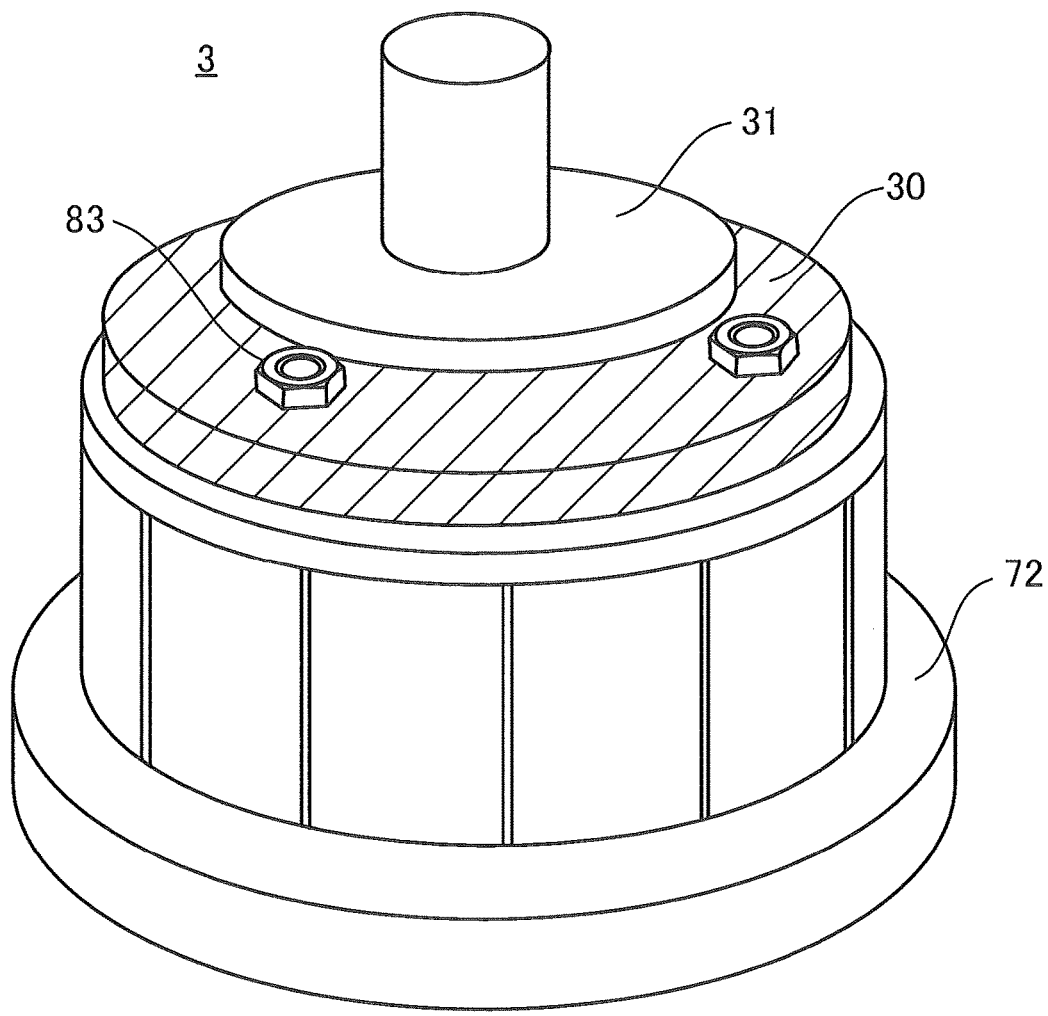
FIG. 11 is a schematic diagram illustrating a state in which the armature is molded as a single body in this embodiment.
Figure 12:
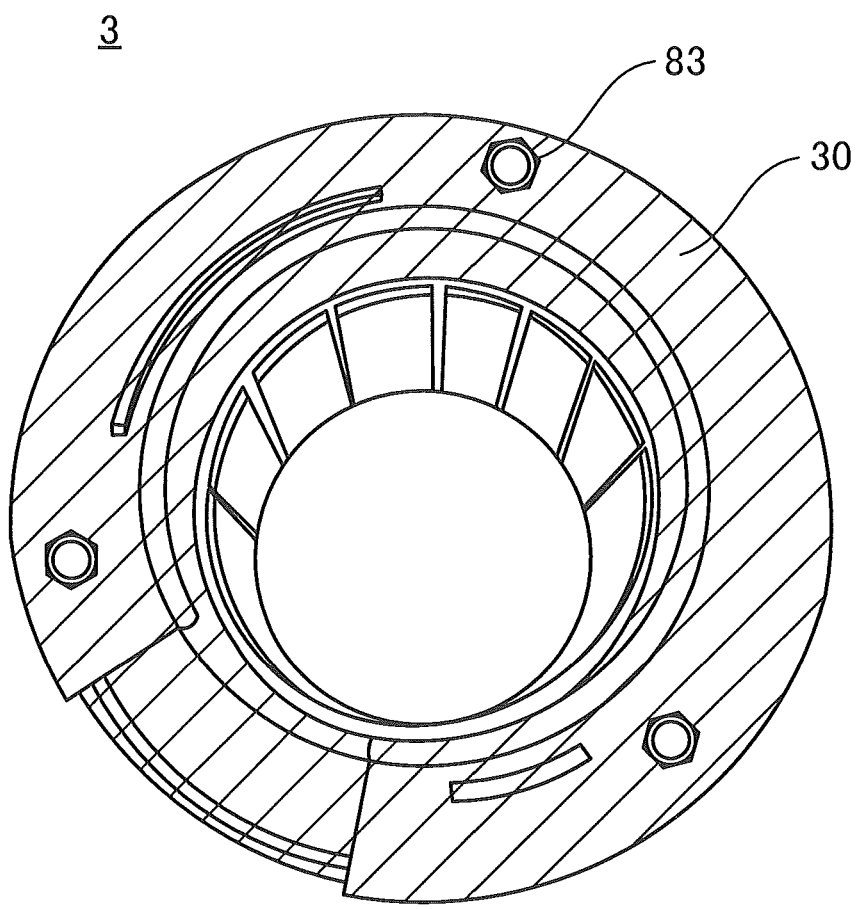
FIG. 12 is a perspective view of the armature that is molded as a single body in this embodiment, when seen obliquely from the top.

FIG. 11 is a schematic diagram illustrating a state in which the armature is molded as a single body in this embodiment. FIG. 12 is a perspective view of the armature that is molded as a single body in this embodiment, when seen obliquely from the top.

As illustrated in FIGS. 11 and 12, the coils 5 wound on the split cores 40 and the plurality of lead wires 51 are covered with the resin mold part 30 while the power line connecting portions 83 of the crimp terminals 80 are exposed to the outside (see FIG. 10).

It is possible to mold the stator 3 as a single body by mounting a columnar mold jig 31 in a rotor receiving hole of the stator (armature) 3 as illustrated in FIG. 11.

Figure 13:
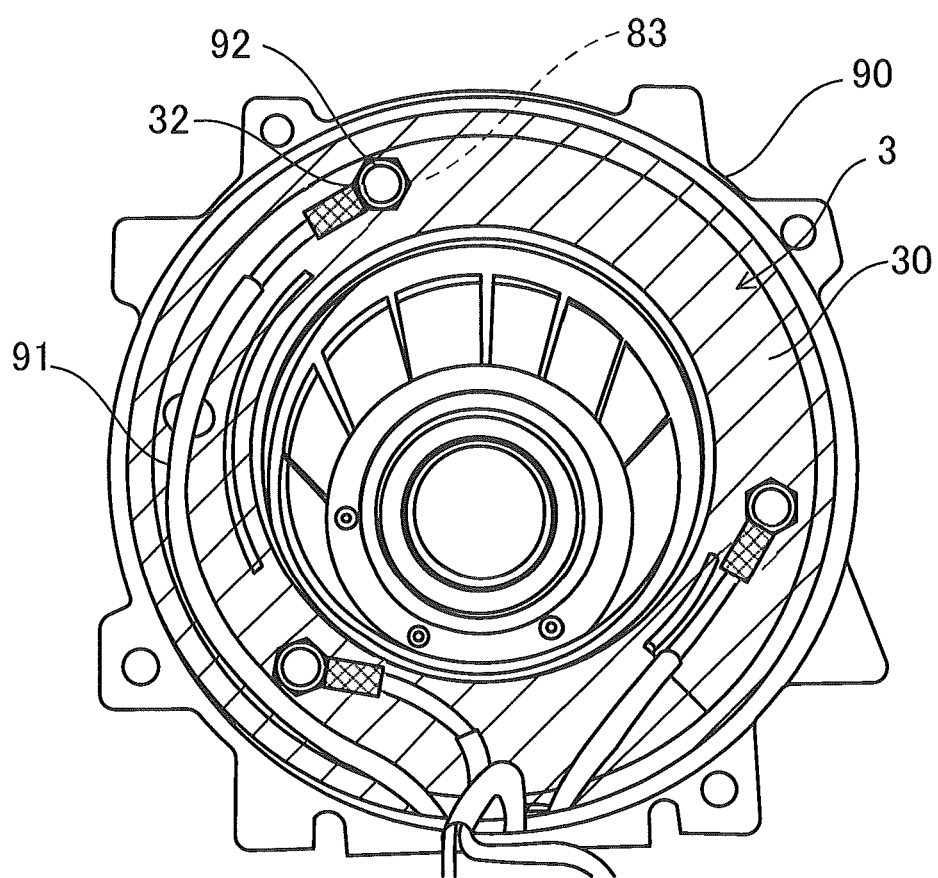
FIG. 13 is a perspective view illustrating a state in which the stator (armature) molded as a single body is received in a casing in this embodiment, when seen obliquely from the top.

FIG. 13 is a perspective view illustrating a state in which the stator (armature) 3 molded as a single body is received in a casing in this embodiment, when seen obliquely from the top.

As illustrated in FIG. 13, the stator (armature) 3 is received in a casing 90 by shrink fitting. A material that can be shrink-fitted, such as an aluminum material or an iron material, is selected as the material of the casing 90. A casting, a die-casting, a lost-wax casting, and an extruded molding are employed in the case of an aluminum material. A casting and a lost-wax casting are employed in the case of an iron material.

As illustrated in FIGS. 10, 12, and 13, power lines 91 of the three-phase AC power source are connected to the power line connecting portions 83, which are exposed to the outside from the resin mold part 30, by fixing screws 92.

Referring to FIGS. 1 and 2 again, the excitation unit 2 including the rotating shaft 1 is disposed as a rotor in the stator 3 of the split-core type motor 100 according to this embodiment.

The split-core type motor 100 illustrated in FIG. 1 is formed as a SPM motor (Surface Permanent Magnet Motor). In the SPM motor, a plurality of permanent magnets 20 are disposed on the surface of a rotor core 21 (or a rotating shaft 1).

The rotor 2 of the split-core type motor 100 illustrated in FIG. 1 includes a plurality of permanent magnets (so-called eccentric magnets) 20 that have a shape in which the center of the inner diameter is different from the center of the outer diameter and are disposed on the surface of the rotor core 21 having a circular cross-section.

The rotor 2 of the split-core type motor 100 is not limited thereto, and may include a plurality of permanent magnets (so-called arcuate magnets) of which outer portions have an arc shape and inner portions have a flat shape and which are disposed on the surface of a rotor core having a polygonal cross-section.

Besides, the split-core type motor 100 may be formed as a SPM motor (not illustrated) in which a ring-shaped permanent magnet (radial anisotropic ring magnet) is disposed on the surface of a rotor core (or a rotating shaft).

Further, the split-core type motor 100 illustrated in FIG. 2 is formed as an IPM motor (Interior Permanent Magnet Motor). In the IPM motor, a plurality of permanent magnets 20 are built in a rotor core 21 in a circumferential direction.

The rotor core 21 is formed of, for example, a soft magnetic body such as a silicon steel sheet.

<Action of Split-Core Type Motor and Method of Manufacturing the Split-Core Type Motor>

Next, the action of the split-core type motor 100 according to this embodiment and methods of manufacturing the armature 3 of the split-core type motor 100 according to first and second embodiments will be described with reference to FIGS. 1 to 15.

<Method of Manufacturing Armature According to First Embodiment>

Figure 14:
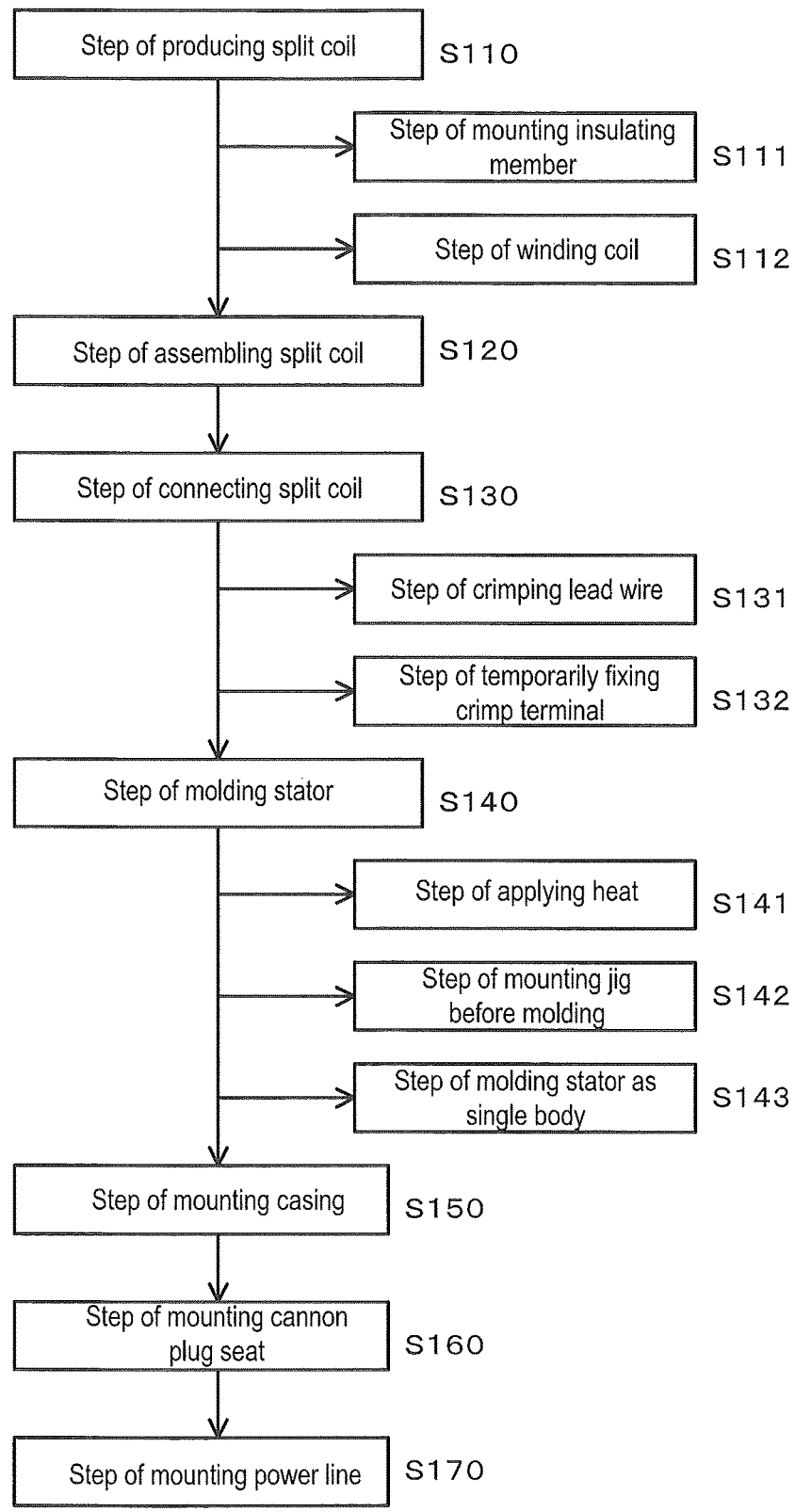
FIG. 14 is a diagram illustrating steps of a method of manufacturing the armature of the split-core type motor according to a first embodiment.

FIG. 14 is a diagram illustrating steps of a method of manufacturing the armature of the split-core type motor according to a first embodiment.

As illustrated in FIG. 14, a method of manufacturing the armature 3 of the split-core type motor 100 according to the first embodiment includes at least a step (S110) of producing the split coils, a step (S120) of assembling the split coils, a step (S130) of connecting the split coils, and a step (S140) of molding the stator (armature).

In the method of manufacturing the armature 3 of the split-core type motor 100 according to the first embodiment, the step (S110) of producing the split coils is performed first. In this embodiment, for example, twelve split coils 50 are produced (see FIGS. 1 and 2).

The step (S110) of producing the split coils includes a step (S111) of mounting the insulating member and a step (S112) of winding the coils.

In the step (S110) of producing the split coils, the step (S111) of mounting the insulating member is performed first. In the step (S111) of mounting the insulating member, as illustrated in FIG. 4, each of the split cores 40 is covered with the insulating member 45 that is a resin molding.

In this embodiment, twelve split cores 40 are combined to form the annular stator core 4 (see FIGS. 1 and 2). A silicon steel sheet or the like is molded by a die to form the split core 40. The split core 40 has a shape in which the core body 43 is interposed between the stator core-inner diameter portion 41 and the stator core-outer diameter portion 42. The inner surface of the stator core-inner diameter portion 41 and the outer surface of the stator core-outer diameter portion 42 are formed by a press so as to have an arc-shaped cross-section.

The insulating member 45 is formed of the pair of insulating insertion members 45a and 45b. The insulating insertion members 45a and 45b are formed by injection molding a synthetic resin in a die. The insulating insertion members 45a and 45b are mounted on the split core 40 by being inserted from both ends of the split core 40 in the longitudinal direction. The insulating member 45 covers both ends of the core body 43, the stator core-inner diameter portion 41, and the stator core-outer diameter portion 42 of the split core 40 in the longitudinal direction.

As illustrated in FIG. 14, the step (S112) of winding the coils is performed next in the step (S110) of producing the split coils. In the step (S112) of winding the coils, the coil 5 is wound around the core body 43 of each split core 40 on which the insulating member 45 has been mounted (see FIGS. 1 to 4). For example, a coated wire such as an enameled wire is employed as the winding wire of the coil 5. An automatic winding machine (not illustrated) is used as a winding machine for the coil 5.

In the step (S110) of producing the split coils, the split coils 50 in which the coils 5 are wound on the split cores 40 on which the insulating members 45 have been mounted are produced as illustrated in FIGS. 1 to 5. In this embodiment, for example, twelve split coils 50 are formed and two lead wires 51 are led from both ends of each of the split coils 50 in a width direction.

As illustrated in FIG. 14, the step (S120) of assembling the split coils is performed next. As illustrated in FIGS. 5 and 6, in the step of assembling the split coils, twelve split coils 50 are combined in a cylindrical shape to form the annular stator core 4 including the coils 5.

The rounding jig 70, which includes the solid jig 71 and the fixing ring 72, is used to assemble the split coils 50 as illustrated in FIGS. 5 and 6. The respective split coils 50 are rounded between the solid jig 71 and the fixing ring 72, and are disposed in a cylindrical shape so that the stator core-inner diameter portions 41 form the inner diameter of the armature and the stator core-outer diameter portions 42 form the outer diameter of the armature.

As illustrated in FIG. 14, the step (S130) of connecting the split coils is performed next. The step (S130) of connecting the split coils includes a step (S131) of crimping the lead wires of the split coils and a step (S132) of temporarily fixing the crimp terminals.

In the step (S130) of connecting the split coils, the step (S131) of crimping the lead wires is performed first.

In the step (S131) of crimping the lead wires, as illustrated in FIGS. 8A, 8B, and 10, the lead wires 51 of the split coils 50 are connected using the crimp terminals 80. Specifically, the lead wires 51 of the split coils 50 are inserted into the crimp tube 81 that is formed at the base end portion of the crimp terminal 80 and the crimp tube 81 is crimped inward in the radial direction, so that the crimp terminal 80 connects the lead wires 51. The base portion 62, which has the shape of a deformed disc and includes the power line connecting portion 83 with a female screw, is formed at the tip portion of the crimp tube 81.

Three crimp terminals 80 are used so as to correspond to the three-phase AC power source. As illustrated in FIGS. 8A, 8B, and 10, the lead wires 51 of the split coils 50 are connected and crimp terminals 80 corresponding to the u phase, the v phase, and the w phase of the three-phase AC power source are mounted.

As illustrated in FIG. 14, the step (S132) of temporarily fixing the crimp terminals is performed next in the step (S130) of connecting the split coils.

In the step (S132) of temporarily fixing the crimp terminals, first, the insertion pin 64 of the terminal block 60 is inserted and fixed to the support portion 46 of the stator core 4 for the temporary fixing of the crimp terminal 80 as illustrated in FIGS. 9 and 10. The terminal blocks 60 are fixed to arbitrary three support portions among the support portions 46 of the stator core 4 so as to correspond to the u phase, the v phase, and the w phase of the three-phase AC power source.

Further, the crimp terminal 80 is fixed to the cylindrical terminal fixing portion 63 of the terminal block 60. The crimp tube 81 of the crimp terminal 80 is placed on the base portion 62 of the terminal block 60. The power line connecting portion 83 is disposed at an upper portion of the crimp terminal 80.

As illustrated in FIG. 14, the step (S140) of molding the stator is performed next. The step (S140) of molding the stator includes a step (S141) of applying heat, a step (S142) of installing the jig before molding, and a step (S143) of molding the stator as a single body.

In the step (S140) of molding the stator, first, the step (S141) of applying heat is performed.

In the step (S141) of applying heat, the stator (armature) is disposed in a high-temperature tank (not illustrated) and heat is applied to the stator so that a resin molding easily adheres.

In the step (S140) of molding the stator, the step (S142) of installing the jig before molding is performed next.

In the step (S142) of installing the jig before molding, as illustrated in FIG. 11, the columnar mold jig 31 made of metal is moved upward from below to and inserted into the rotor receiving hole of the stator 3 including the split coils 50. Since the columnar jig is inserted into the rotor receiving hole of the stator 3, the adhesion of a resin into the rotor receiving hole of the stator 3 is prevented.

In the step (S140) of molding the stator, the step (S143) of molding the stator as a single body is performed next.

In the step (S143) of molding the stator as a single body, the stator 3 in which the mold jig 31 has been mounted as illustrated in FIGS. 11 and 12 is received in a molding die of an injection molding machine (not illustrated) and the stator 3 is molded with a resin. The coils 5 wound on the split cores 40, the terminal blocks 60, and the plurality of lead wires 51 are also covered with the resin mold part 30 by the step (S143) of molding the stator as a single body so that the power line connecting portions 83 of the crimp terminals 80 are exposed to the outside (see FIG. 10).

Next, a step (S150) of mounting the casing is performed.

In the step (S150) of mounting the casing, the casing 90 is heated and the stator (armature) 3 is received in the casing 90 by shrink fitting as illustrated in FIG. 13. For example, a material that can be shrink-fitted, such as an aluminum material or an iron material, is selected as the material of the casing 90. A casting, a die-casting, a lost-wax casting, and an extruded molding are employed in the case of an aluminum material. A casting and a lost-wax casting are employed in the case of an iron material.

As illustrated in FIG. 14, a step (S160) of mounting a cannon plug seat is performed next and a step (S170) of mounting the power lines is then performed.

In the step (S170) of mounting the power lines, as illustrated in FIG. 13, the power line 91 is fixed to the power line connecting portion 83 of the crimp terminal 80, which is exposed on the resin mold part 30, by the fixing screw 92. Work for mounting the power line 91 is performed for the respective power line connecting portions 83 corresponding to the u phase, the v phase, and the w phase.

The armature 3 of the split-core type motor 100 is completed by the above-mentioned steps S110 to S170.

<Method of Manufacturing Armature According to Second Embodiment>

Figure 15:
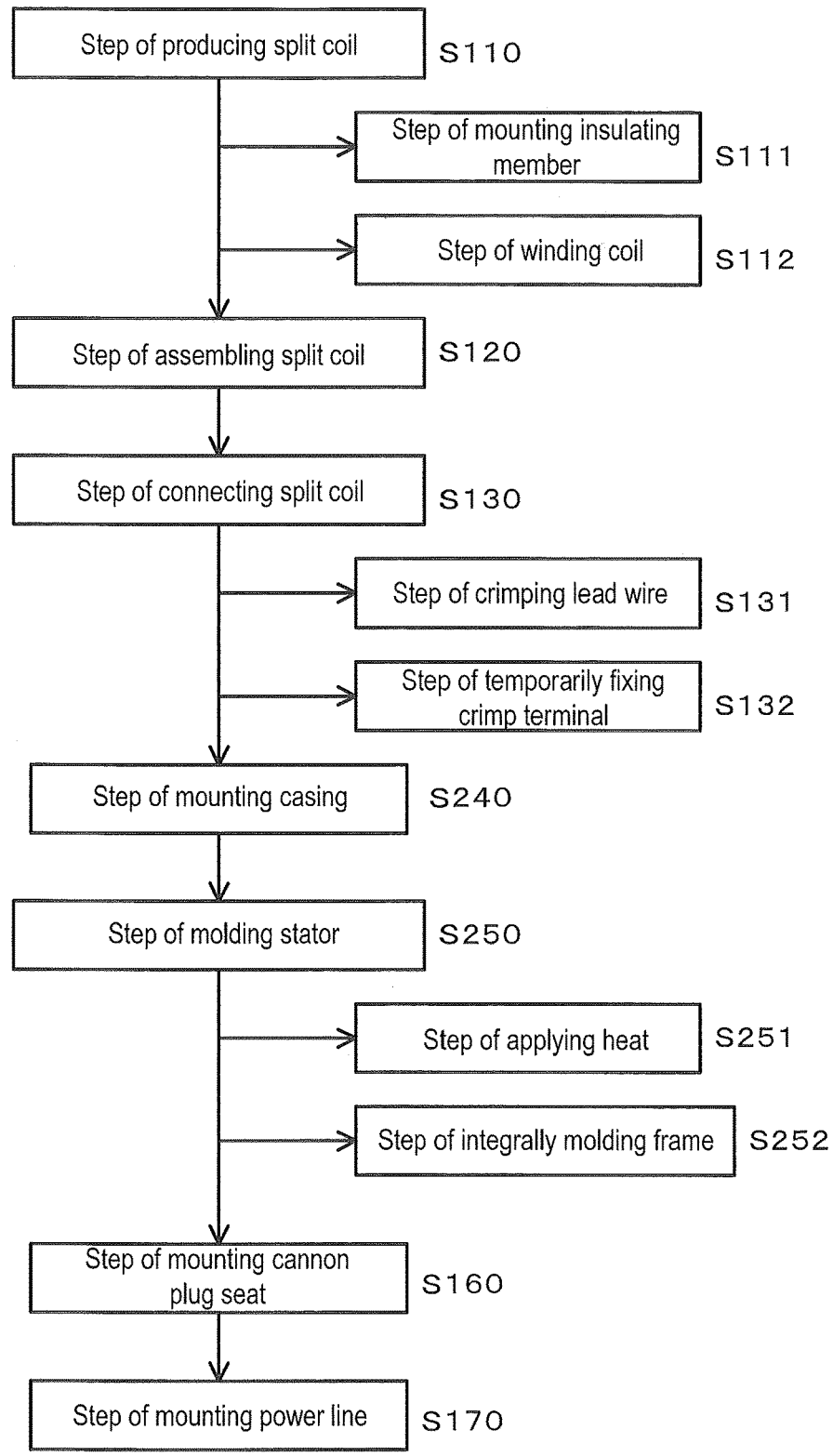
FIG. 15 is a diagram illustrating steps of a method of manufacturing the armature of the split-core type motor according to a second embodiment.

FIG. 15 is a diagram illustrating steps of a method of manufacturing the armature of the split-core type motor according to a second embodiment.

As illustrated in FIG. 15, a method of manufacturing the armature of the split-core type motor according to the second embodiment is different from that according to the first embodiment in terms of the order of a step (S250) of molding the stator and a step (S240) of mounting the casing and the contents of the step (S250) of molding the stator.

That is, since a step (S110) of producing the split coils, a step (S120) of assembling the split coils, a step (S130) of connecting the split coils, a step (S160) of mounting a cannon plug seat, and a step (S170) of mounting the power lines are performed in the same manner as the first embodiment, the description thereof will not be made.

In the method of manufacturing the armature of the split-core type motor according to the second embodiment, the step (S250) of molding the stator is performed after the step (S240) of mounting the casing.

In the step (S240) of mounting the casing, the casing is heated and the stator (armature) is received in the casing by shrink fitting as in the first embodiment. The same material as the material used in the first embodiment is employed as the material of the casing.

The step (S250) of molding the stator includes a step (S251) of applying heat and a step (S252) of integrally molding a frame.

In the step (S250) of molding the stator, the step (S251) of applying heat is performed first.

In the step (S251) of applying heat, the stator (armature) on which the casing has been mounted is disposed in a high-temperature tank (not illustrated) and heat is applied to the stator so that a resin molding easily adheres.

In the step (S250) of molding the stator, the step (S252) of integrally molding a frame is performed next.

In the step (S252) of integrally molding a frame, the stator on which the casing has been mounted is received in a molding die of an injection molding machine (not illustrated) and the stator is molded with a resin. The coils 5 wound on the split cores 40, the terminal blocks 60, and the plurality of lead wires 51 are also covered with the resin mold part by the step (S252) of integrally molding a frame so that the power line connecting portions 83 of the crimp terminals 80 are exposed to the outside (see FIG. 10).

Since the step (S250) of molding the stator is performed after the casing is mounted on the stator in the step (S252) of integrally molding a frame of the second embodiment, a mold jig is not needed unlike in the step (S143) of molding the stator as a single body of the first embodiment.

<Action of Split-Core Type Motor>

Referring to FIGS. 1 and 2 again, the excitation unit 2 including the rotating shaft 1 is disposed in the stator (armature) 3 as a rotor. The excitation unit 2 includes the plurality of permanent magnet 20 that are provided, for example, on the rotor core 21. The rotor core 21 is formed of, for example, a soft magnetic body such as a silicon steel sheet.

The split-core type motor 100 according to this embodiment includes the excitation unit 2 in which the plurality of permanent magnets 20 are disposed on the rotor core 21 in the circumferential direction, and the armature 3 which is provided so as to surround the excitation unit 2 and in which the plurality of split coils 50 are assembled in an annular shape.

In this embodiment, the armature 3 functions as a stator and the excitation unit 2 functions as a rotor. That is, in the split-core type motor 100 of this embodiment, current flows in the coils 5 of the armature 3 so as to cross the magnetic flux that is generated by the permanent magnets of the excitation unit. When the magnetic flux of the permanent magnets 20 and the current flowing in the coils 5 of the armature 3 cross each other, the split-core type motor 100 of this embodiment rotates the rotor by generating a driving force on the rotor in the circumferential direction by electromagnetic induction.

According to this embodiment, the crimp terminals 80 including the power line connecting portions 83 connect the lead wires 51 of the plurality of split coils 50 by being crimped so that the lead wires of the split coils correspond to the u phase, the v phase, and the w phase of the three-phase AC power source. The crimp terminals 80 form terminals that correspond to the u phase, the v phase, and the w phase, respectively.

Accordingly, since the split-core type motor 100 according to this embodiment uses the crimp terminals 80, it is possible to easily perform work for connecting wires as compared to soldering work and the reliability of wire connection quality is also improved. Since the crimp terminals 80 and the terminal blocks 60 are employed, the crimp terminals 80 including the power line connecting portions 83 are easily positioned.

That is, the split-core type motor 100 according to this embodiment can make the work for connecting the lead wires 51 of the split coils 50 simple and efficient. Accordingly, the split-core type motor 100 according to this embodiment can reduce the man-hours taken to connect wires and reduce manufacturing costs by reducing the time taken to connect wires.

Further, according to this embodiment, since the coils 5, the terminal blocks 60, and the lead wires 51 are covered with the resin mold part 30 while the power line connecting portions 83 of the crimp terminals 80 are exposed to the outside, the power line connecting portions 83 are easily installed on the resin mold part 30. Furthermore, since the stator (armature) 3 is molded as a single body by using the columnar mold jig 31, it is possible to reduce the lead time of resin molding. It is possible to more easily connect the power lines 91 by tightening the fixing screws 92 to the power line connecting portions 83 of the crimp terminals 80.

Hereinbefore, although the preferred embodiments of the invention have been described, these embodiments are examples for the purpose of describing the invention, and it is not intended to limit the scope of this invention to only the above embodiments. That is, this invention can be practiced in various aspects different from the above-mentioned embodiments without departing from the gist of the invention.

What is claimed is:

1. A split-core type motor comprising:
an excitation unit that includes permanent magnets; and
an armature that includes a plurality of split coils,
wherein the armature at least comprises,
the plurality of split coils that are formed by winding coils on split cores on which insulating members have been mounted,
a stator that is formed by disposing the plurality of split coils in an annular shape,
crimp terminals that include power line connecting portions, connect lead wires of the split coils by being crimped so that the lead wires of the split coils correspond to a u phase, a v phase, and a w phase of a three-phase AC power source, and form terminals corresponding to the u phase, the v phase, and the w phase, respectively,
a resin mold part that covers the coils and the lead wires while the power line connecting portions of the crimp terminals are exposed to the outside,
terminal blocks mounted on the split cores;
each crimp terminal having a power line connection section having a crimped section that connects to one of the phases of the AC power source and a female screw portion mounted on a corresponding one of the terminal blocks; and
wherein each of the crimp terminals is adapted to be connected to an external power line by threaded engagement of the external power line and the female screw portion;

wherein the resin mold part covers the coils, the lead wires, the crimp terminals and the terminal block while only the power line connecting portion is exposed to the outside.

2. The split-core type motor according to claim 1, wherein the crimp terminals comprise three crimp terminals each respectively corresponding to the u phase, the v phase and the w phase of the three-phase AC power source, and each of the three crimp terminals includes:
   a crimp tube that connects the lead wires of the split coils by a crimped connection.

3. The split-core type motor according to claim 2, wherein the terminal block is made of an insulating material,
the terminal block comprises three terminal blocks each respectively corresponding to each of the three crimp terminals, and
each of the three terminal blocks includes an insertion pin inserted into one of the split core, so that the three terminal blocks are fixed by the insertion pins to the split cores at three positions.

4. The split-core type motor according to claim 1, wherein each of the split cores includes a recess and a protrusion, the recess adapted to engage with the protrusion of a first adjacent split core and the protrusion adapted to engage with recess of a second adjacent split core, whereby all of the split cores engage into an annular shape.

5. The split-core type motor according to claim 1, wherein the female screw is disposed above the resin mold part and the crimp terminals are molded in the resin mold.

6. The split-core type motor according to claim 1, wherein each crimp terminal is a unitary one piece component.

7. The split-core type motor according to claim 1, wherein the external power line is a male threaded screw that inserts into the female threaded screw.

* * * * *